April 7, 1925.
J. W. SHANBECK
1,533,035
CUTTING MEANS FOR MOWING MACHINES
Filed Nov. 2, 1921      2 Sheets-Sheet 1
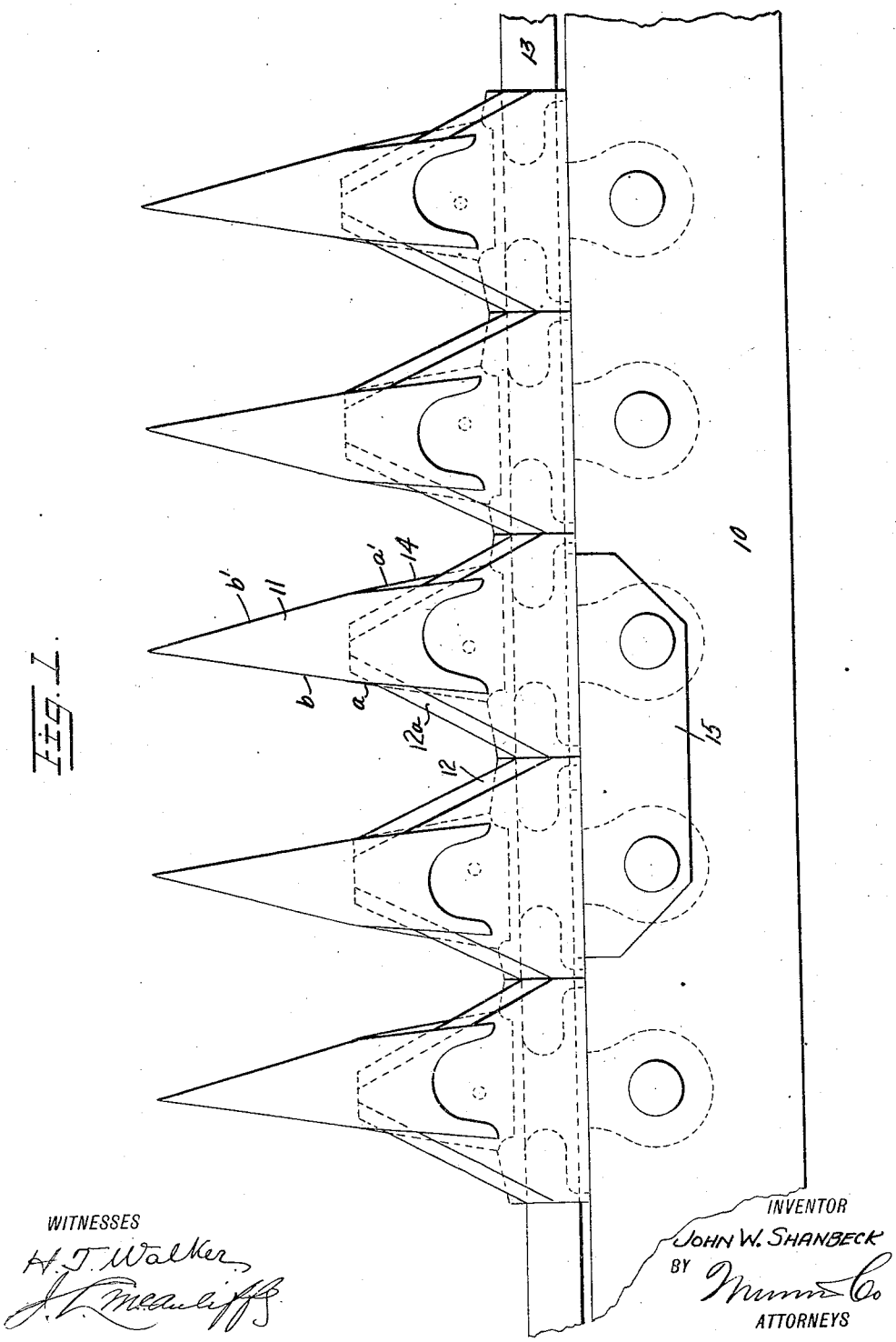
WITNESSES
INVENTOR
John W. Shanbeck
BY
ATTORNEYS April 7, 1925.  1,533,035
J. W. SHANBECK
CUTTING MEANS FOR MOWING MACHINES
Filed Nov. 2, 1921    2 Sheets-Sheet 2
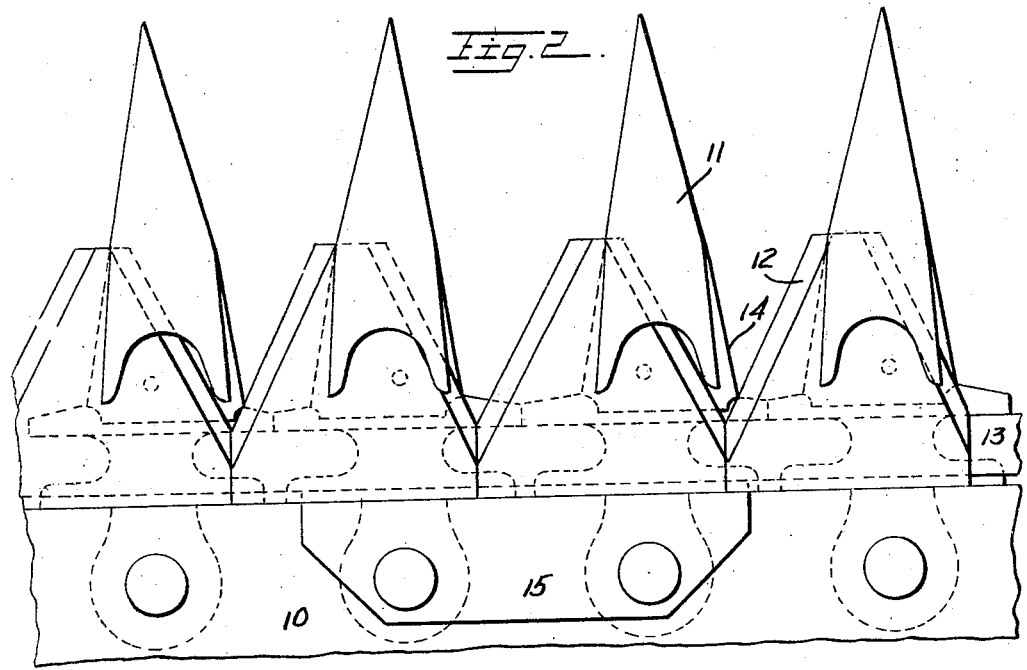
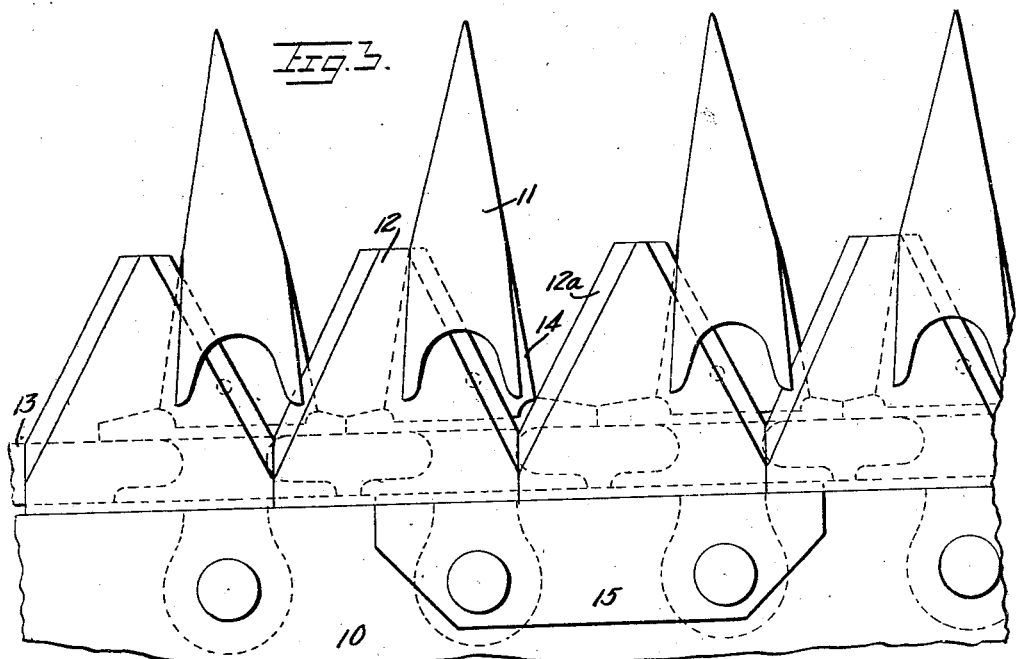
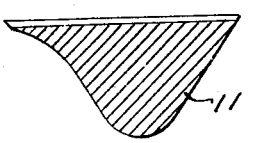
WITNESSES
H. J. Walker
INVENTOR
John W. Shanbeck
BY
ATTORNEYS Patented Apr. 7, 1925.

1,533,035

UNITED STATES PATENT OFFICE.

JOHN W. SHANBECK, OF FORT WAYNE, INDIANA.

CUTTING MEANS FOR MOWING MACHINES.

Application filed November 2, 1921. Serial No. 512,249.

*To all whom it may concern:*

Be it known that I, JOHN W. SHANBECK, a citizen of the United States, and a resident of Fort Wayne, in the county of Allen and State of Indiana, have invented a new and Improved Cutting Means for Mowing Machines, of which the following is a description.

The general object of my invention is to eliminate the several strains incident to the cutting operation of mowing machines as at present constructed, and to so distribute the strains developed that the parts will operate evenly and smoothly without jerking and without the sickle and pitman being subjected to undue strains. The stated object is attained by bringing about a substantial equalization of the cutting resistance throughout the cutting stroke by so forming and arranging the parts that not all the knives will have their hardest work at the same instant during a stroke of the sickle, a part of the knives doing their hardest work before the peak of the work of others of the knives is reached, thereby not only relieving the cutting parts of uneven strain but also relieving the machine generally. Incidentally, this results in giving a lighter draft and a longer life to the machine, and also, the liability of the machine choking down with hard-cutting grass is materially reduced and lost motion in the sickle is to a great extent prevented.

The nature of the invention and its distinctive features and advantages will clearly appear as the description proceeds.

Reference is to be had to the accompanying drawings forming a part of this specification, it being understood that the drawings are merely illustrative of one example of the invention.

Figure 1 is a plan view of a portion of the cutting means of a mower embodying my invention;

Figures 2 and 3 are fragmentary plan views representing two different positions of the knives during a stroke of the sickle bar;

Figure 4 represents a transverse vertical section of a guard or finger at the heel or rear end of the ledger plate.

In carrying out my invention in accordance with the illustrated example, I employ the essential elements of the cutting means usually employed in mowing machines except as modified in particulars as hereinafter referred to, said means comprising a finger bar 10 carrying the guards or fingers 11, knives 12, 12$^a$ distinguished one from the other in particulars as will appear, said knives being mounted on the sickle bar or knife arm 13 and I employ as well ledger plates 14 and sickle guides one of which is shown and indicated by the numeral 15.

It will be observed that the knives are of uniform width at the heel as in ordinary mowers but alternately wider and narrower at the front ends. Also, it will be observed that one side edge $a$ of ledger plates 14 and that portion of the adjacent side edge $b$ of a guard 11 in front of the ledger plate are on the same straight line passing through the point of the finger while at the opposite side the edge $a^1$ of the ledger plate and that portion of the side edge $b^1$ of the finger 11 in front of the ledger plate are either on straight or curvilinear lines at an angle, or lie in planes at an angle to each other, the plane of said edge $b^1$ passing through the point of the finger while the plane of the adjacent edge $a^1$ of the ledger plate 14 is a material distance laterally of the point of the finger. Also, it will be noted that each finger 11 is formed wider at one side of the medial line than at the other side of the medial line, the finger having the greater width between the medial line and that side of the finger at which the edge of the ledger plate and the forward portion of the edge of the finger are in planes at an angle to each other. The said fingers 11, however, at the heel, it will be observed, are of uniform width. It is further to be noted that the variation in the two side edges of the finger and ledger plate are reversed in alternate fingers and ledger plates so that there is alternately a wider and a narrower space between the ledger plates and between the fingers at the ledger plates. A further important point to be observed is that although the alternate knives (12, 12$^a$) are wider and narrower, at the front end nevertheless, at the end of a stroke or throw of the sickle bar and knives, the medial lines of all the knives correspond with the medial lines of the fingers or with lines drawn lengthwise of the fingers through the points.

In operation with the cutting means formed and arranged as described as the sickle bar 13 moves in a direction, say, toward the left of the figures, when those knives having the wider front ends arrive at the opposed side edges of the adjacent ledger plates 14, as shown in Figure 2, the corresponding side edges of those knives having the narrower front ends have still a considerable distance to travel toward the adjacent ledger plates 14 and also when those knives having the narrower ends arrive at the heels of the opposed ledger plates, as in Figure 3, the knives with the wider front ends have already done a considerable part of their cutting because having moved a substantial distance across the opposed cutting edges of the adjacent ledger plates, and this, while the narrower knives are just beginning to cut. Similarly, when the knives having the wider front have finished a cutting stroke in connection with the cutting edge on the adjacent ledger plates and are passing into the guards or fingers, those knives having the narrower front ends have yet considerable cutting to do in the same stroke. The same relative actions of the wider and narrower knives are repeated at each throw or stroke of the sickle bar in each direction.

Those knives having the narrower front ends are so placed on the finger bar that they will work between those ledger plates and between those fingers presenting the wider spaces. On the other hand the alternate knives broadened at the front in accordance with my invention operate between those ledger plates and those fingers presenting the narrower spaces.

Those knives with the wider front ends have a more acute slope at their cutting edges than the knives with the narrower front ends and to offset this lesser slope the ledger plates at those edges disposed at the narrower space between the ledger plates will have a correspondingly greater slope from the heels to the front ends of the ledger plates; the result is to give a uniform angle to both series of knives relatively to the opposed cutting edges on the ledger plates. Thus, comparing Figures 2 and 3, it will be noted that that knife at the right of the figures has a wide front end and its cutting edge has just approached the ledger plate on the next finger to the left. A similar situation is found with respect to the narrower knife 12ª at the central space of Figure 3 which latter knife has just arrived at the ledger plate on the finger 11 to the left. It will be observed that the wider knife 12 at the right of Figure 2 has the same position with respect to the ledger plate 14 to the left as the knife 12ª in the central space of Figure 3 has to the ledger plate 14 on the finger 11 next to the left, and it will be noted that the angle of the said knife 12 in Figure 2 with the ledger plate 14 to the left is the same as the angle of the knife 12ª with the ledger plate 14 to the left. In other words, it will be seen that the cutting angle is the same between all the knives and the cooperating ledger plates throughout the complete cutting mechanism and this angle corresponds with the cutting angle in mowing machines generally.

Referring to Figure 4 it will be seen that the guards or fingers are formed at the under side to present a slight concavity at that side farthest from the medial plane of the guard, this formation affording clearance for mud and smaller stones to pass through, notwithstanding the reduced space between the ledger plates at said concave side of the guard.

I would state in conclusion that while the illustrated example constitutes a practical embodiment of my invention, I do not limit myself strictly to the exact details herein illustrated, since, manifestly, the same can be considerably varied without departure from the spirit of the invention as defined in the appended claims.

Having thus described my invention, I claim:

1. In a cutting means for mowers, a series of spaced apart ledger plates, alternate spaces between adjacent ledger plates being equal in width and adjacent spaces between adjacent ledger plates being of different widths, a cutter bar, cutter blades secured to the bar and corresponding in number with the spaces between adjacent ledger plates, each cutter blade being movable across the space between two adjacent ledger plates.

2. In a cutting means for mowers, a series of spaced apart ledger plates, alternate spaces between adjacent ledger plates being equal in width and adjacent spaces between adjacent ledger plates being of different widths, a cutter bar, cutter blades secured to the bar and corresponding in number with the spaces between adjacent ledger plates, each cutter blade being movable across the space between two adjacent ledger plates, all of said blades being equal in width at their inner ends and blades which are movable across the narrower spaces between adjacent ledger plates being wider than the remaining blades.

3. In a cutting means for mowers, a series of spaced apart ledger plates, alternate spaces between adjacent ledger plates being equal in width and adjacent spaces between adjacent ledger plates being of different widths, a cutter bar, cutter blades secured to the bar and corresponding in number with the spaces between adjacent ledger plates, each cutter blade being movable across the space between two adjacent ledger plates, and a guard finger for each ledger plate, each guard finger projecting at one side farther from a straight line extending between the middle points on the opposite ends of the finger than at the opposite side.

4. In a cutting means for mowers, a series of spaced apart ledger plates, alternate spaces between adjacent ledger plates being equal in width and adjacent spaces between adjacent ledger plates being of different widths, a cutter bar, cutter blades secured to the bar and corresponding in number with the spaces between adjacent ledger plates, each cutter blade being movable across the space between two adjacent ledger plates, and a guard finger for each ledger plate, each guard finger projecting at the side of the finger that is nearest to one of the narrower spaces between adjacent ledger plates than at the other side of the finger.

5. In a cutting means for mowers, a series of spaced apart ledger plates, alternate spaces between adjacent ledger plates being equal in width and adjacent spaces between adjacent ledger plates being of different widths, a cutter bar, cutter blades secured to the bar and corresponding in number with the spaces between adjacent ledger plates, each cutter blade being movable across the space between two adjacent ledger plates, and a guard finger for each ledger plate, each guard finger projecting at one side farther from a straight line extending between the middle points on the opposite ends of the finger than at the opposite side, each guard finger having a concavity in the lateral face of its inner end portion.

JOHN W. SHANBECK.